March 3, 1970  H. A. SIZE  3,498,481
POWERED FOLD UNDER LIFT GATE
Filed June 8, 1967  4 Sheets-Sheet 1
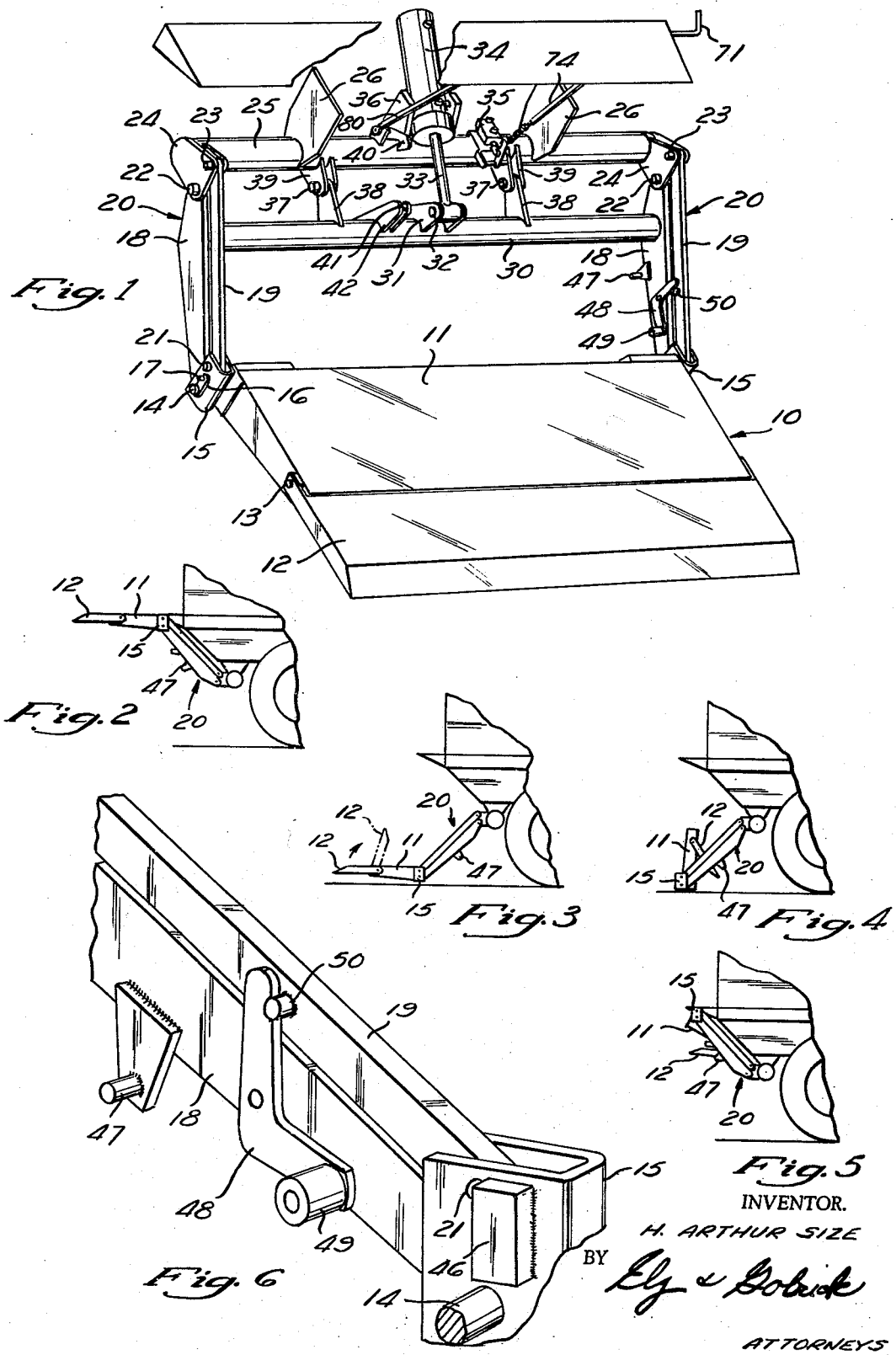
INVENTOR.
H. ARTHUR SIZE
BY Ely & Golrick
ATTORNEYS March 3, 1970  H. A. SIZE  3,498,481
POWERED FOLD UNDER LIFT GATE
Filed June 8, 1967  4 Sheets-Sheet 2

INVENTOR.
H. ARTHUR SIZE
BY
Ely, Golrick & Flynn
ATTORNEYS

March 3, 1970 H. A. SIZE 3,498,481
POWERED FOLD UNDER LIFT GATE
Filed June 8, 1967 4 Sheets-Sheet 3
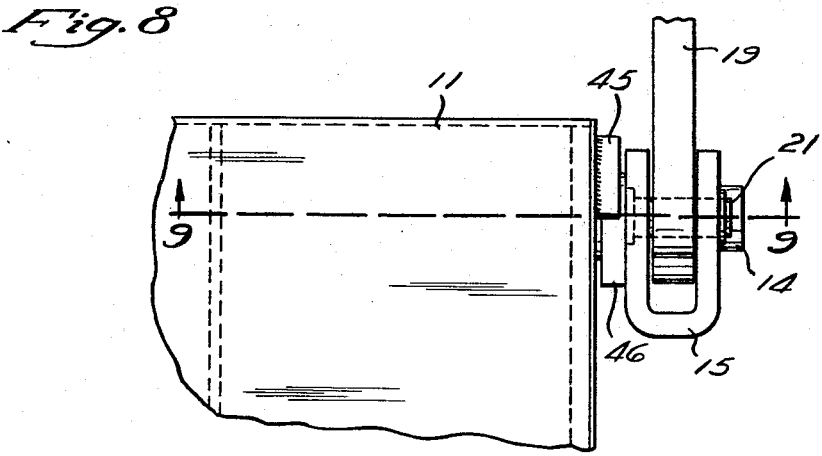
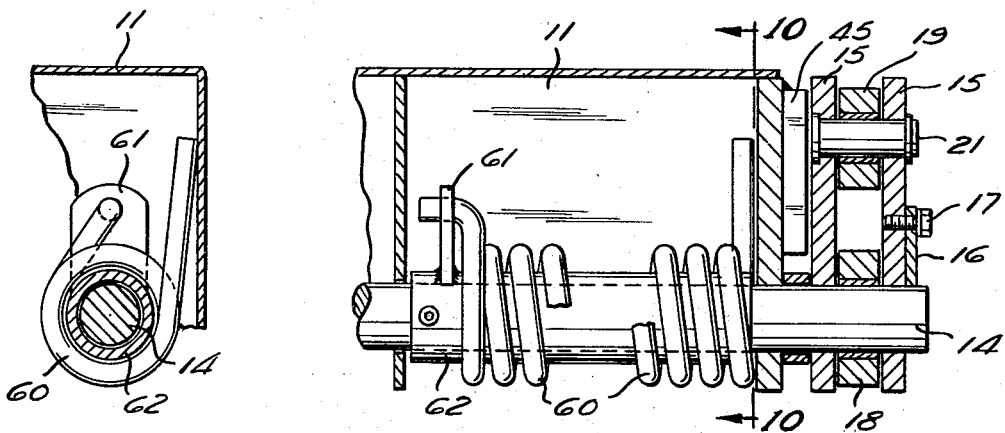
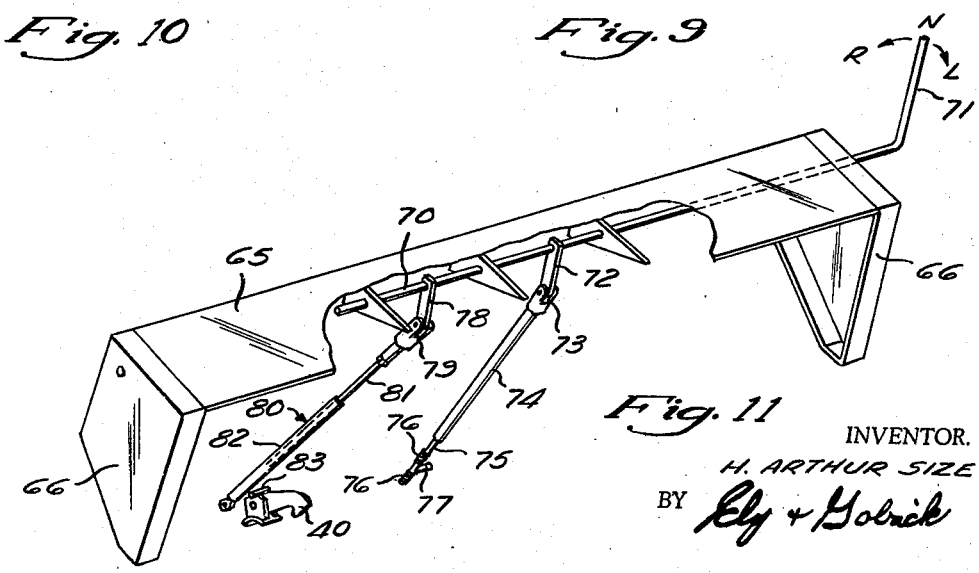
INVENTOR.
H. ARTHUR SIZE
BY Ely + Golrick
ATTORNEYS March 3, 1970    H. A. SIZE    3,498,481
POWERED FOLD UNDER LIFT GATE
Filed June 8, 1967    4 Sheets-Sheet 4

INVENTOR.
H. ARTHUR SIZE
BY
Ely, Golrick & Flynn
ATTORNEYS

United States Patent Office 3,498,481
Patented Mar. 3, 1970

3,498,481
POWERED FOLD UNDER LIFT GATE
Harrie Arthur Size, Findlay, Ohio, assignor to Daybrook-Ottawa Corporation, a corporation of Delaware
Filed June 8, 1967, Ser. No. 644,568
Int. Cl. B60p 1/26
U.S. Cl. 214—77                                          9 Claims

ABSTRACT OF THE DISCLOSURE

Powered lifting gate for attachment to truck bodies for lifting loads from ground to truck bed height. Replaceable pivot link on lifting linkage permits level or ramping rise. During truck travel, or for loading dock at truck bed height, foldable platform is folded under by same operation of linkage which lifts platform for loading operation. Counterbalancing of platform sections permits manual folding of platform to position where operation of lifting linkage complete folding operation. Operation of lifting linkage to lower platform unfolds the folded under platform to accessible position for manually unfolding the platform. Platform automatically latched at raised or folded-in position of platform, but operation of control to lower automatically unlatches the platform.

---

This invention relates to improvements in powered gates or load-lifting platforms for truck bodies whereby loads placed on the platform may be raised or lowered between the ground and the bed of the truck. More particularly, the invention relates to such a powered platform in which, during travel or when the truck is backed to a loading dock at the truck bed height, the platform is folded out of the way beneath the bed of the truck, permitting the truck body doors to be opened or closed.

It is an object and advantage of this invention that the entire mechanism is of a simple and rugged construction, yet, for its load capacity, it may be relatively light in weight, as compared with prior art mechanisms of equal stability and load capacity.

Another object and advantage of this invention is that the platform, which is split to permit it to be folded under the truck body bed, is easily manually maneuverable into or out of a folded position due to counterbalancing springs but the completion of the folding or unfolding action from or to the manually folded position is effected by the powered operation of the load lifting and lowering mechanism.

A further object and advantage of this invention is that the load-lifting mechanism is readily and simply altered to provide either a level rise from the ground to the truck bed (and lowering from the bed to the ground) or a so-called ramping action whereby the platform is inclined slightly upwardly toward the truck at ground level and slightly downwardly toward the truck at bed level.

A still further object and advantage of this invention is that the platform is automatically latched into its raised or folded-in position but is automatically unlatched when the control mechanism, which also stops the lifting or lowering action when released, is actuated to lower or unfold the platform.

Other and further objects and advantages of this invention will be apparent to those skilled in the art from the following specification, claims, and drawings, in which:

FIG. 1 is a perspective view, partly broken away, of an embodiment of this invention adapted to be mounted on a truck body, showing the platform in its lowered position.

FIG. 2 is a partly diagrammatic side view of the mechanism shown in FIG. 1, but with the platform in the raised level-rise position, and the bed extension partly broken away to show the pivot link.

FIG. 3 is a view similar to FIG. 2, but with the platform slightly raised to permit the platform extension section to be manually raised to the broken line position shown, in order to commence the folding operation.

FIG. 4 is a view similar to FIG. 3, but showing the main platform section manually raised to a vertical position, from whence the completion of the folding operation is accomplished by the powered linkage of this embodiment.

FIG. 5 is a view similar to FIG. 1, but showing the platform in its fully folded position.

FIG. 6 is an enlarged fragmentary detail of the right-hand pivot link and lifting linkage to show the platform extension fold stop, platform camming bellcrank, and platform load-lifting stop.

FIG. 8 is a detailed fragmentary plan view of the pivot link shown in FIG. 7, but with a fragmentary portion of the main platform section.

FIG. 9 is a cross-section along the line 9—9 of FIG. 8.

FIG. 10 is a cross-section along the line 10—10 of FIG. 9.

FIG. 11 is a detailed exploded view showing the bed extension and controls carried thereby.

Figure 7:
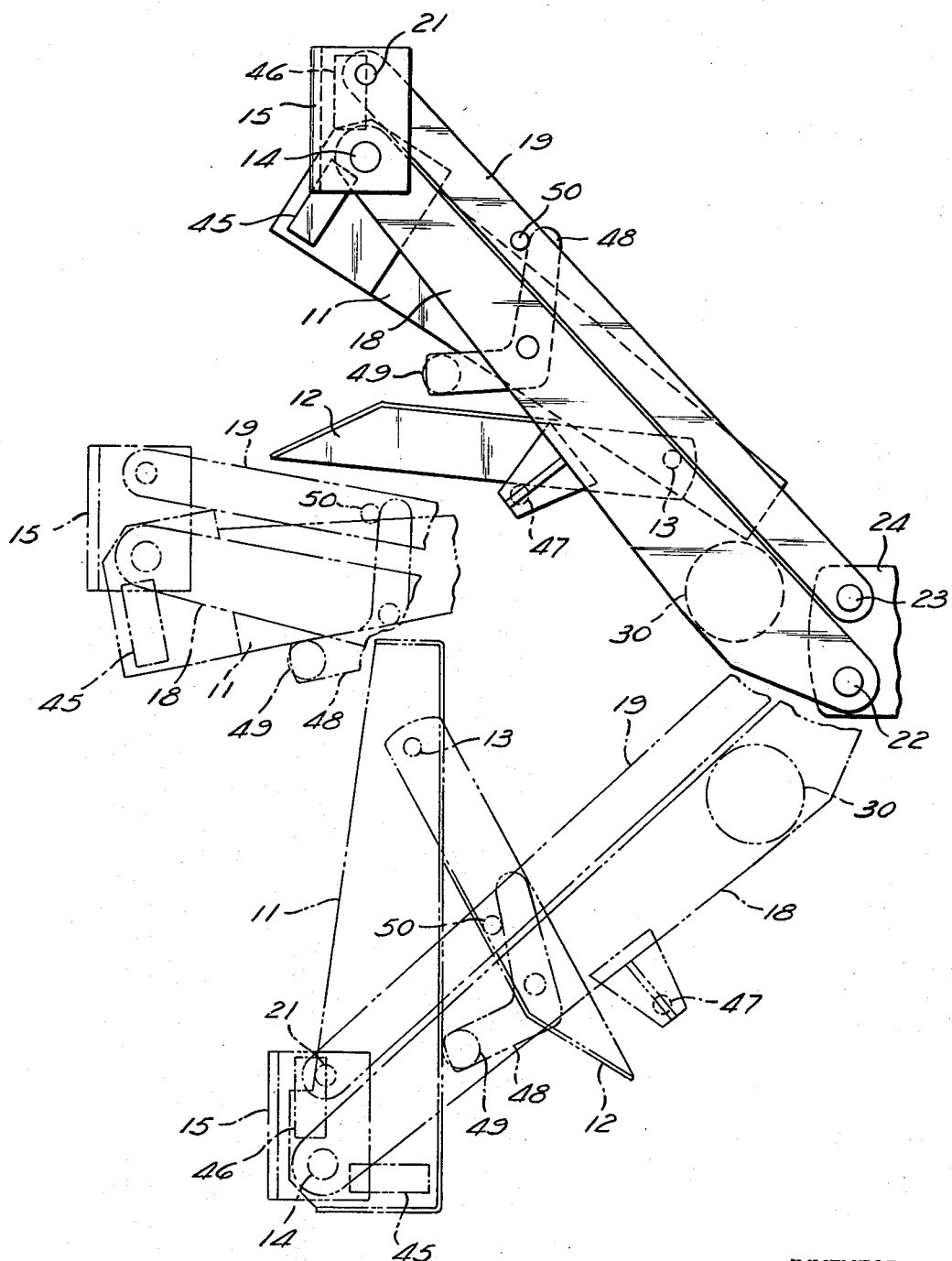
FIG. 7 is an enlarged fragmentary detail showing the platform and lifting linkage in the fully-folded position together with fragmentary details showing the bellcrank camming action in, successively, intermediate and fully lowered positions.

Referring to FIG. 1, the split platform 10 is comprised of a main section 11 carrying an extension 12 pivoted to the main section 11 by pivots 13 so that when the forward face of the extension 12 abuts the rear face of the main section 11, the upper surfaces are locked in the planar position shown in FIG. 1 but the extension 12 may be manually lifted to a folded position as shown, for example, in FIGS. 3 to 5 and 7.

The main platform section 11 is carried on the lower pivot shafts 14 which are removably fixed in the lower bearing holes of the U-shaped pivot links 15 by means of the tangs 16 welded to the shafts 14 and fastened to the pivot links by the screws 17. Each of the pivot links 15 has journaled on the shafts 14 the lower compression links 18 of the pair of outboard lifting link assemblies 20. The upper tension links 19 of the assemblies 20 are pivoted in the pivot links 15 by means of the pins 21. The forward ends of the links of the assemblies 20 are pivoted on the pins 22 and 23 of the spaced pairs of end brackets 24 welded on the outboard ends of the fixed base tube 25. The base tube 25 is provided with a pair of frame brackets 26 by which the entire assembly thus far described may be bolted, welded, or otherwise installed on the chassis beneath the bed of a truck to be equipped with the loading mechanism of this invention.

Figure 12:
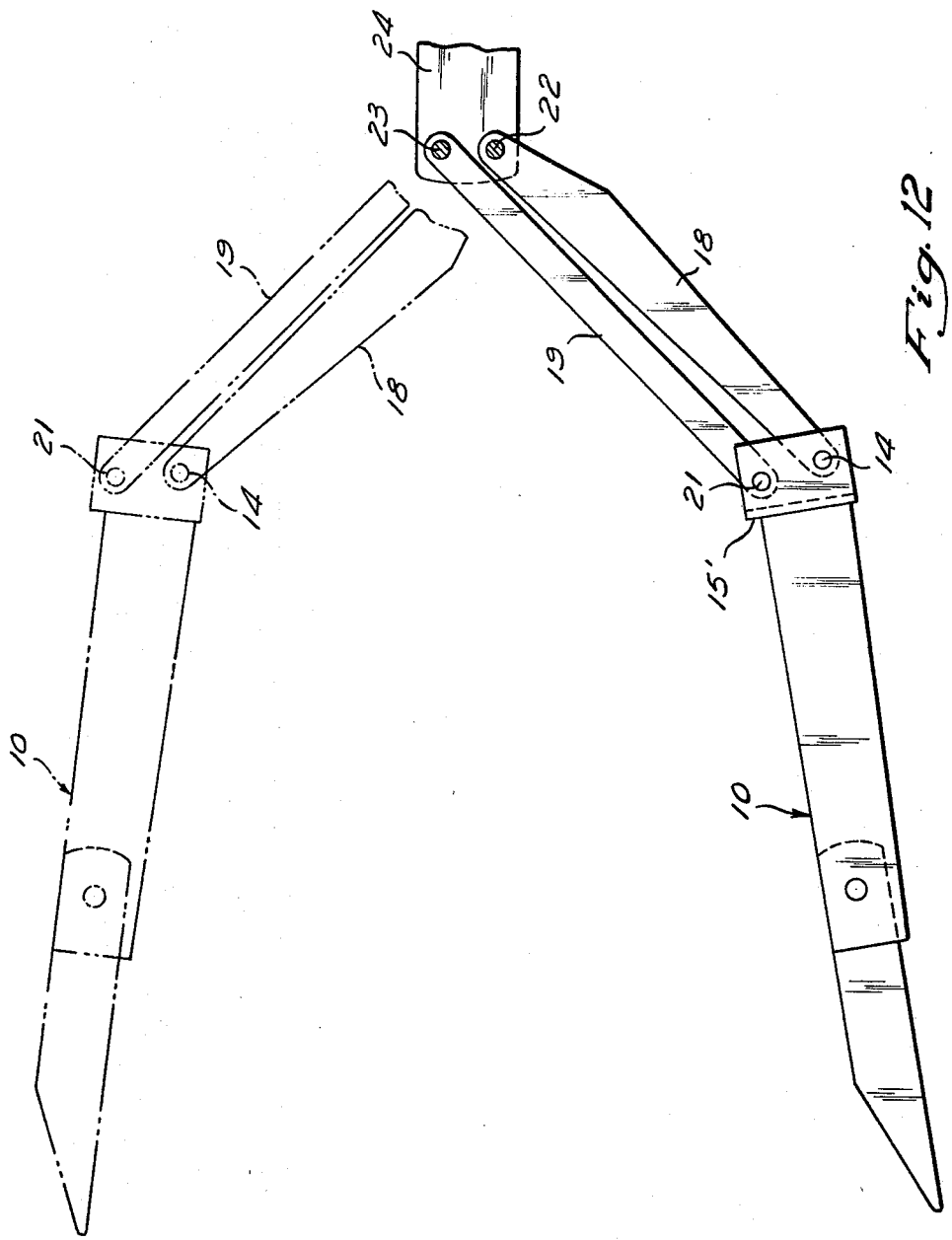
FIGURE 12 is a side view, with parts omitted for clarity, of the present mechanism having pivot links which provide a ramping action for the platform, with the mechanism shown in full lines in its lowered position and shown in phantom lines in in its raised position.

At this point it should be noted that with the lengths of the links 18 and 19 of the assemblies 20 being equal between their respective pivots and the spacing of the rear pivots 14 and 21 being equal to the spacing of the pins 22 and 23, the lifting linkage is a parallelogram providing parallel motion and a level rise of the platform from the ground position shown in FIG. 1 to the truck bed height as shown in FIG. 2. It should also be noted that the arrangement described above permits the ready disconnection of the pivot links 15 by removal of the pivots 14 and 21. Replacement of the links 15 with substitute links 15 in which the bearings for the pivots 14 and 21 are spaced slightly farther apart than the pivots 22 and 23 will provide a trapezoidal linkage as shown in FIG. 12. This will permit the so-called ramping action of the platform 10, which is often desired for heavy loads; that is, when the platform 10 is lowered to the ground it may be inclined slightly upwardly toward the truck, but when the platform is raised to bed height, it may be inclined slightly downwardly toward the truck, easing the movement of loads from the platform to the truck bed.

To raise and lower the platform, a main lift tube 30 extends between the compression links 18. The center of the tube 30 is provided with crank arms 31 for the crank pin 32 journaled in a bearing carried by the piston rod 33 of the hydraulic cylinder 34 connected by tubes not shown for clarity of illustration through a control valve 35 on the base tube 25 to a suitable source of hydraulic power, usually a pump (not shown) driven either by a power take-off from the truck's transmission or by a motor driven by the truck's electrical system. The cylinder 34 is pivotally mounted in trunnions 36 on the base tube 25. Preferably between the cylinder 34 and crank 31 and each end bracket 24, the lift tube 30, in addition to being pivoted about the linkage pivots 20 is also pivotally connected through the pins 37 aligned with pins 22 and carried by the pairs of stabilizing brackets 38 and 39 welded to the lift tube 30 and base tube 25, respectively. It should be emphasized that these intermediate stabilizing assemblies not only exert a stiffening effect upon the lift tube 30, which is subjected to both torque and transverse bending loads by the crank 31 but have been found to have a stabilizing effect upon the entire assembly, permitting in combination with the outboard linkages (and provided the main platform section 11 is suitably stiffened) the lifting of off-center loads on the platform without noticeable distortion beyond that attributable to lost motion in the several pivot bearings, even though such off-center loads may be near the entire rated load capacity of the equipment.

The cylinder 34 and available operating hydraulic pressure through the valve 35, which is preferably of the type which is closed when in an intermediate or neutral position will hold the platform at whatever position it may be when the valve 35 is closed to lock the fluid in the cylinder, but, as an added safety feature, permitting the power to the hydraulic system to be shut off while the truck is traveling or the platform is at bed height and personnel will usually be standing on the platform, a spring-pressed, normally closed latch 40 is carried by the base tube 25. A latch pin 41 is carried by the clevis 42 welded to the lift tube 30 so that the pin latches under the latch 40 when the piston rod 23 is fully withdrawn into the cylinder 34 and the lift tube 30 is raised to its uppermost position.

To fold under the split platform 10, the cylinder 34 is operated to raise the platform 10 slightly as shown in FIG. 3 so that an operator may reach under the extension 12 and raise it somewhat beyond a dead-center position as shown in FIG. 3. The operator then manually raises the main platform section 11 so that it stops 45 (see FIG. 8) pivot away from the stops 46 carried by the pivot links 15 and the section 11 assumes a vertical position, as shown in FIG. 4 (see also lower fragmentary portion of FIG. 7). It is to be noted here that each compression link 18 carries a dependent platform stop pin 47 and at least one compression link carries a pivoted bellcrank 48 having a cam roller 49 on its rearwardly extending arm and its upwardly extending arm engaging a cam pin 50 carried by the corresponding tension link 19. Engagement of the platform section 11 with the cam roller 49 prevents the section from being pulled by the then overhanging section 12 through an appreciable arc beyond the vertical position of the section 11. It is also to be noted that the stop pins 47 are positioned so that they will just be cleared by the platform extension 12 as the section 11 is lifted to its vertical position.

Operation of the cylinder 34 to raise the lift linkages 20 will cause the main platform section 11 to ride on the cam roller 49 until the section 11 assumes a substantially horizontal position (see intermediate fragmentary portion of FIG. 7) and the extension 12 swings down from its overhanging position to engage the stops 47. As the linkage 20 is raised further the bellcrank 48 falls clear of the section 11 and the entire folded platform rides on the stop pins 47 when the linkage 20 is raised to its maximum latched position, where the platform is thus folded under the truck bed. (See FIG. 5 and upper portion of FIG. 7.) To lower the platform from its folded-under position upon release of the latch 40 and operation of the cylinder 34, the lowering of the linkage to about a mid-way position will cause the section 11 to engage the roller 49 of the bellcrank 48 and further movement causes the cam pin 50 to act on the bellcrank 48 to cam the section 11 upwardly to substantially a vertical position as the lift-linkage reaches its lower-most position. Thereafter the sections 11 and 12 may be manually unfolded to the planar position of FIG. 1 for use as a lifting platform.

The platform extension 12 is usually light enough so that it presents no problem in being lifted between its horizontal and beyond dead-center vertical position in folding and unfolding the platform. The weight of the entire platform which must be lifted when the main section 11 is folded usually exceeds that which can be conveniently handled manually without assistance. To provide such assistance, means as shown in FIGS. 8 to 10 is provided. The shaft 14 on which the section 11 is pivoted extends into a box section beneath the tread surface of the section 11, where the shaft 14 passes through a heavy biasing coil spring 60. One end of the spring 60 bears against the forward face of the section 11 and the other is retained in an arm 61 welded to a tube 62 which, in turn, is pinned to the fixed shaft 14. Movement of the section 11 from its folded vertical position to its horizontal platform position winds up the spring 60 to provide its optimum biasing effect, which may be only a few pounds less than enough to fully counterbalance the weight of the section 11 and the section 12 raised to its vertical position. Unfolding of the section 12 to its horizontal platform position more than overcomes the counterbalancing biasing effect of the spring 60 and provides a stable platform assembly 10 for loading and unloading.

To provide a support for the control means as well as a cover for the platform and lifting assembly during use, a truck bed extension 65, adapted to be attached at the rear of the truck bed and having end covers 66, is provided. Journaled in gusset plates beneath the extension 65 is a transverse control shaft 70 having an operating handle 71. The control shaft 70 is connected by a crank arm 72 and clevis 73 to a control tube 74 telescopically mounted on a control rod 75 connected to the control linkage of the valve 35. The rod 75 is normally held in a neutral position by opposed springs 76 acting on either side of a fixed rod guide 77. These springs act to normally hold the rod 75 in a neutral position but permit the valve 35 to be shifted from its normally closed position by actuation of the handle 71 to actuate the hydraulic cylinder 34 to raise or lower the linkage assembly 20.

The control shaft 70 also carries a crank arm 78 connected to the clevis 79 of the latch control rod assembly 80. The assembly 80 comprises a rod 81 telescoped in a tube 82, in turn pivotally connected to the pin 83 of the latch 40. Operation of the handle 71 telescopes the rod 81 into the tube 82 against a stop which, thereupon, lifts the latch 40 to release the latch pin 41 and allows the linkage assembly 20 to be lowered. Actuation of the handle 71 toward the raise position has no effect upon the latch 40, which is, thus, normally ready to latch the pin

What is claimed is:

1. A powered load-lifting platform adapted to be mounted under the bed of a truck or similar load-carrying surface comprising a fixed transverse frame member; outboard end brackets on said frame member; a pair of substantially parallel link assemblies, each link assembly comprising a lower fixed-length compression link and an upper fixed-length tension link pivoted at their forward ends in respective spaced pivot bearings in the respective end bracket, and a pivot link pivotally connected to the rearward ends of said fixed-length tension and compression links equidistantly from their connections to said end brackets, a split platform assembly comprising a main section pivoted to said pivot links and an extension pivoted to the rear of said main section, stop means limiting the pivotal movement of said platform assembly outwardly of said link assembly but permitting said extension to be folded onto said main section and said main section to be folded inwardly of said link assemblies, means for limiting the folding of said main section inwardly of said link assemblies to a substantially vertical upstanding position of said main section when said link assemblies are in a lowered position with respect to said frame member, a transverse lift member extending between said compression links, and a hydraulic cylinder and crank connected between said transverse frame member and said lift member, whereby actuation of said cylinder to raise and lower said link assemblies will raise and lower said platform assembly as a load-lifting platform when its sections are unfolded outwardly and will fold and unfold said platform assembly under the bed when said sections are folded inwardly.

2. A powered lifting platform as defined in claim 1 including interchangeable pairs of pivot links, one pair of said links having its pivotal connections to said tension and compression links spaced equal to the spacing between the pivot bearings of said end brackets, whereby raising of said link assemblies will provide a level rise of said platform from its lowered position to bed height, and the other pair of said interchangeable pivot links having its pivotal connections to said tension and compression links spaced greater than the spacing between the pivot bearings of said end brackets, whereby raising and lowering said link assemblies will impart a ramping action to said platform.

3. A powered lifting platform as defined in claim 1, including a stabilizing linkage extending between said frame member and said lift member and located between said cylinder and crank and an end bracket, said stabilizing linkage comprising a first bracket arm connected to said frame member, a second bracket arm connected to said lift member, and a pivot connecting said bracket arms and aligned with the pivotal connection of said compression links to said end brackets.

4. A powered lifting platform as defined in claim 1, including a normally biased latch and latch pin mounted on said frame member and said lift member and positioned to latch when said link assemblies are raised to their uppermost position, and means to disengage said latch from said pin when said cylinder is actuated to lower said link assemblies.

5. A powered lifting platform as defined in claim 1, including a stop positioned on a compression link to be just cleared by said platform extension when said extension is folded on said main section and said main section is folded from a horizontal platform position to a substantially vertical upstanding position, and said means for limiting the folding of said main section inwardly comprises cam means carried by a compression link and acting between its corresponding tension link and said main section to cam said main section from and toward said substantially vertical upstanding position as said link assemblies are raised and lowered.

6. A powered lifting platform as defined in claim 1, including biasing means acting between said link assemblies and said main platform section to substantially counter-balance the weight of said platform assembly when said platform extension is folded onto said main section.

7. A powered lifting platform as defined in claim 1, including a source of hydraulic power for said cylinder, a normally closed metering valve interposed between said cylinder and said power source, and means to actuate said valve to meter hydraulic fluid to said cylinder to raise said link assemblies or meter the exhaust of fluid from said cylinder to lower said link assemblies.

8. A powered lifting platform as defined in claim 1 wherein said platform is connected to the tension links only through the pivot links and is pivoted to the pivot links in alignment with the pivotal connections of the pivot links to said compression links.

9. A powered load-lifting platform adapted to be mounted under the bed of a truck or similar load-carrying surface comprising a fixed transverse frame member; outboard end brackets on said frame member; a pair of substantially parallel link assemblies, each link assembly comprising a lower fixed-length compression link and an upper fixed-length tension link pivoted at their forward ends in respective spaced pivot bearings in the respective end bracket, and interchangeable pairs of pivot links pivotally connected to the rearward ends of said fixed-length tension and compression links equidistantly from their connections to said end brackets; a split platform assembly comprising a main section pivoted to said pivot links about the respective pivotal connections of said pivot links to the compression links and an extension pivoted to the rear of said main section; one pair of said interchangeable pivot links having its pivotal connections to said tension and compression links spaced equal to the spacing between the pivot bearings of said end brackets, whereby raising of said link assemblies will provide a level rise of said platform from its lowered position to bed height, and the other pair of said interchangeable pivot links having its pivotal connections to said tension and compression links spaced greater than the spacing between the pivot bearings of said end brackets, whereby raising and lowering said link assemblies will impart a ramping action to said platform; stop means limiting the pivotal movement of said platform assembly outwardly of said link assembly but permitting said extension to be folded onto said main section and said main section to be folded inwardly of said link assemblies; a transverse lift member extending between said compression links; and a hydraulic cylinder and crank connected between said transverse frame member and said lift member, whereby actuation of said cylinder to raise and lower said link assemblies will raise and lower said platform assembly as a load-lifting platform when its sections are unfolded outwardly and will fold and unfold said platform assembly under the bed when said sections are folded inwardly.

References Cited

UNITED STATES PATENTS

| | | |
|---|---|---|
| 2,391,813 | 12/1945 | Wood. |
| 2,527,818 | 10/1950 | Ives. |
| 2,989,196 | 6/1961 | Lugash. |
| 3,305,112 | 2/1967 | Brown. |
| 2,725,152 | 11/1955 | Gwinn. |
| 3,065,869 | 11/1962 | Mathers et al. |
| 3,258,140 | 6/1966 | Appleman. |
| 3,269,567 | 8/1966 | Lugash. |
| 3,369,678 | 2/1968 | Robinson. |
| 3,369,679 | 2/1968 | Robinson. |

ROBERT G. SHERIDAN, Primary Examiner

ROBERT J. SPAR, Assistant Examiner